US012608202B2

(12) United States Patent
Morgan et al.

(10) Patent No.: US 12,608,202 B2
(45) Date of Patent: Apr. 21, 2026

(54) FLOATING-POINT SCALAR COMPARISON WITH ENHANCED FLAGS

(71) Applicant: Intel Corporation, Santa Clara, CA (US)

(72) Inventors: John Morgan, Snoqualmie, WA (US); Deepti Aggarwal, Gilbert, AZ (US); Michael Espig, Newberg, OR (US); H. Peter Anvin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 18/217,543

(22) Filed: Jul. 1, 2023

(65) Prior Publication Data

US 2024/0103866 A1    Mar. 28, 2024

Related U.S. Application Data

(60) Provisional application No. 63/410,100, filed on Sep. 26, 2022.

(51) Int. Cl.
*G06F 9/30* (2018.01)

(52) U.S. Cl.
CPC ...... *G06F 9/30021* (2013.01); *G06F 9/30036* (2013.01)

(58) Field of Classification Search
CPC ........................ G06F 9/30021; G06F 9/30036
See application file for complete search history.

(56) References Cited

U.S. PATENT DOCUMENTS

| 6,393,555 | B1 * | 5/2002 | Meier | ................. | G06F 9/30101 |
| | | | | | 712/225 |
| 7,039,792 | B1 * | 5/2006 | Anvin | ................. | G06F 9/30021 |
| | | | | | 712/E9.02 |
| 2023/0072105 | A1 * | 3/2023 | Heinecke | .............. | G06F 9/3016 |

* cited by examiner

*Primary Examiner* — Corey S Faherty
(74) *Attorney, Agent, or Firm* — Nicholson De Vos Webster & Elliott LLP

(57) ABSTRACT

Detailed herein are examples of instructions and their hardware support for floating-point comparison that makes use of the distinction between signed integer comparison and unsigned integer comparison to make an analogous distinction between floating-point relationships including unordered and those that do not. These instructions may reduce the number of instructions required to compare and conditionally execute operations in a program, including instructions to load values and instructions to explicitly test for the unordered condition.

20 Claims, 16 Drawing Sheets

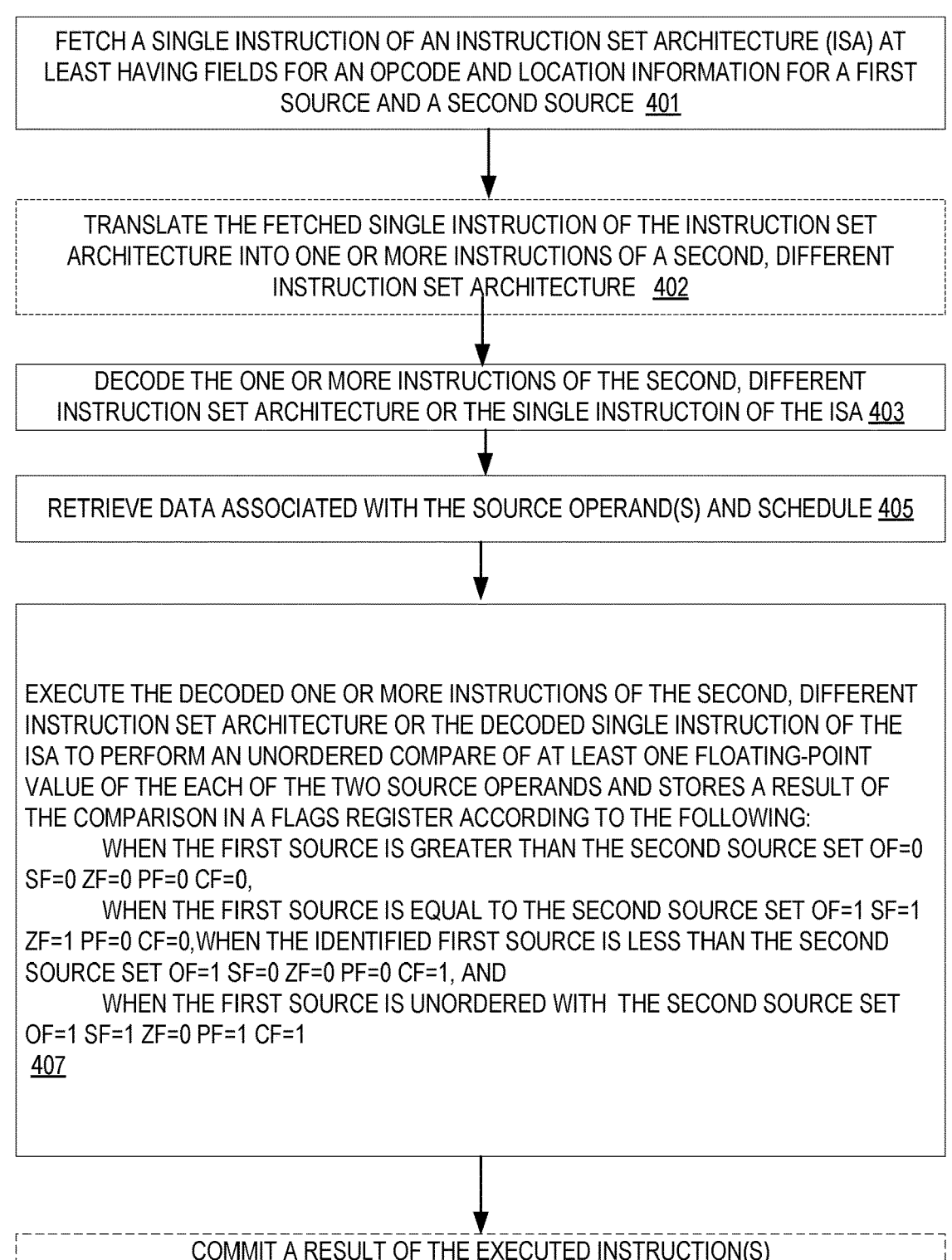

FETCH A SINGLE INSTRUCTION OF AN INSTRUCTION SET ARCHITECTURE (ISA) AT LEAST HAVING FIELDS FOR AN OPCODE AND LOCATION INFORMATION FOR A FIRST SOURCE AND A SECOND SOURCE 401

TRANSLATE THE FETCHED SINGLE INSTRUCTION OF THE INSTRUCTION SET ARCHITECTURE INTO ONE OR MORE INSTRUCTIONS OF A SECOND, DIFFERENT INSTRUCTION SET ARCHITECTURE 402

DECODE THE ONE OR MORE INSTRUCTIONS OF THE SECOND, DIFFERENT INSTRUCTION SET ARCHITECTURE OR THE SINGLE INSTRUCTOIN OF THE ISA 403

RETRIEVE DATA ASSOCIATED WITH THE SOURCE OPERAND(S) AND SCHEDULE 405

EXECUTE THE DECODED ONE OR MORE INSTRUCTIONS OF THE SECOND, DIFFERENT INSTRUCTION SET ARCHITECTURE OR THE DECODED SINGLE INSTRUCTION OF THE ISA TO PERFORM AN UNORDERED COMPARE OF AT LEAST ONE FLOATING-POINT VALUE OF THE EACH OF THE TWO SOURCE OPERANDS AND STORES A RESULT OF THE COMPARISON IN A FLAGS REGISTER ACCORDING TO THE FOLLOWING:
    WHEN THE FIRST SOURCE IS GREATER THAN THE SECOND SOURCE SET OF=0 SF=0 ZF=0 PF=0 CF=0,
    WHEN THE FIRST SOURCE IS EQUAL TO THE SECOND SOURCE SET OF=1 SF=1 ZF=1 PF=0 CF=0,WHEN THE IDENTIFIED FIRST SOURCE IS LESS THAN THE SECOND SOURCE SET OF=1 SF=0 ZF=0 PF=0 CF=1, AND
    WHEN THE FIRST SOURCE IS UNORDERED WITH THE SECOND SOURCE SET OF=1 SF=1 ZF=0 PF=1 CF=1
407

COMMIT A RESULT OF THE EXECUTED INSTRUCTION(S)
409

FIG. 4

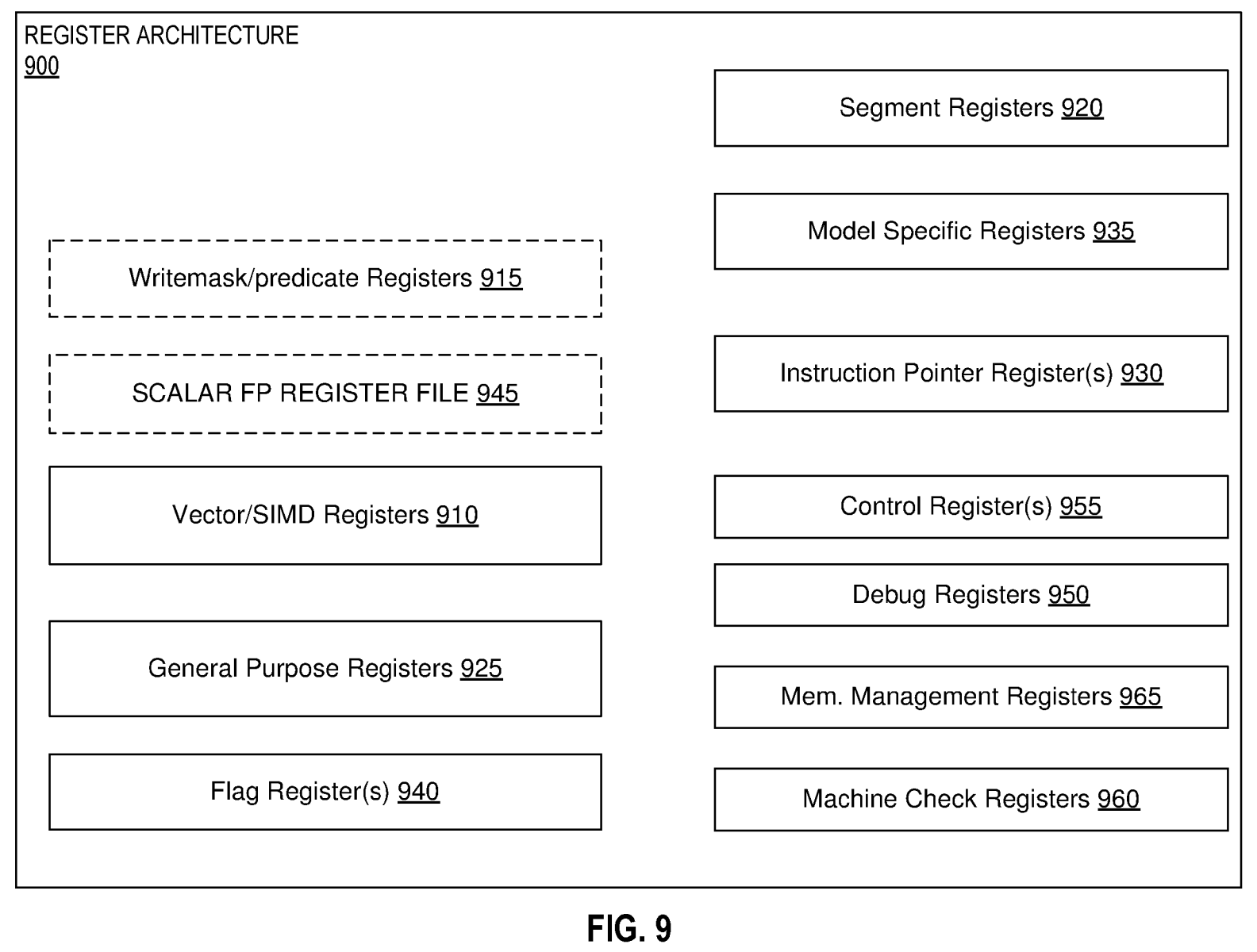

REGISTER ARCHITECTURE
900

Writemask/predicate Registers 915

SCALAR FP REGISTER FILE 945

Vector/SIMD Registers 910

General Purpose Registers 925

Flag Register(s) 940

Segment Registers 920

Model Specific Registers 935

Instruction Pointer Register(s) 930

Control Register(s) 955

Debug Registers 950

Mem. Management Registers 965

Machine Check Registers 960

FIG. 9

FLOATING-POINT SCALAR COMPARISON WITH ENHANCED FLAGS

BACKGROUND

Floating-point values can be compared to determine their relationship to each other, where the relationship is one of greater-than, equal-to, less-than, or unordered. Once the relationship has been determined certain actions can be selected to be performed when the relationship is a member of a subset of the allowed relationships, such as greater-than or equal-to. This is similar to the way integer values are compared, except that those values cannot have the unordered relationship.

The four possible relationships between floating-point values result in fourteen possible reductions to a single true or false value, where at least one relationship will result in true and at least one relationship will result in false. For example, the greater-than or equal reduction results in a true value if the relationship is either greater-than or equal and false otherwise.

BRIEF DESCRIPTION OF DRAWINGS

Various examples in accordance with the present disclosure will be described with reference to the drawings, in which:

FIG. 4 illustrates an example method to process an instance of a VCOMXxx instruction using circuitry, emulation, and/or binary translation.

FIG. 9 is a block diagram of a register architecture according to some examples.

DETAILED DESCRIPTION

The present disclosure relates to methods, apparatus, systems, and non-transitory computer-readable storage media for performing floating-point scalar comparison with flags.

In some computer architectures, comparing values and testing the relationships are processed as two steps, where the first step encapsulates information about the relationships between the values in a set of flags, and the second step evaluates one or more flags to check if the relationship meets certain criteria.

Ideally, the second step should be as similar for floating-point values and integer values as possible, but this is complicated because "not less-than" is the same as "greater-than or equal to" for integer values, but the unordered relationship means that it is not for floating-point values.

In some architectures, there are scalar floating-point comparison instructions that calculate the "greater-than" and "greater-than or equal-to" relationship combinations, so that "less-than" and "less-than or equal-to" can be determined by reversing the order of the values compared. For vector comparison, some architectures encode the relationship combination to be tested into the comparison instruction so that a simple true or false value is returned.

Unfortunately, the use of a comparison operand order to correctly evaluate floating-point relationships has three disadvantages: 1) operand order can vary from the source operand order, 2) it can require the use of an extra register and load operation to evaluate the condition, and 3) it can interfere with using the result of the comparison to evaluate multiple relationships. The use of combined comparison and relationship testing would also interfere with using the result of the comparison to evaluate multiple relationships and would make floating-point comparison less like integer comparison instead of more so.

Detailed herein are examples of instructions and their hardware support for floating-point comparison that makes use of the distinction between signed integer comparison and unsigned integer comparison to allow the analogous distinction between floating-point relationship reductions including unordered and those that do not. This may reduce the number of instructions required to compare and conditionally execute operations in a program, including instructions to load values and instructions to explicitly test for the unordered condition. This may also result in fewer branch instructions to track for branch prediction or fewer values loaded into registers. These instructions may also make it easier to understand compiler-generated code for debugging.

Figure 1:
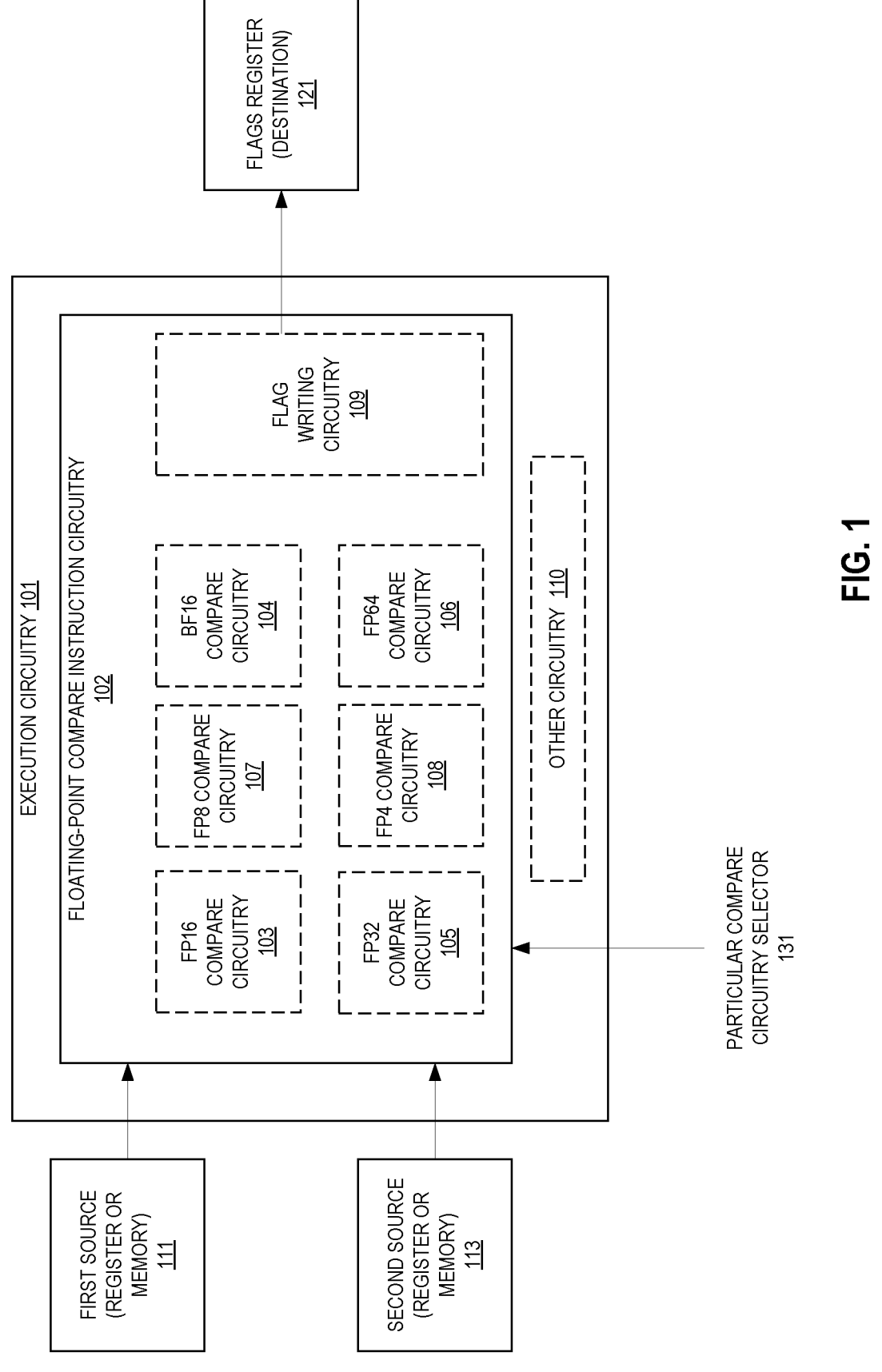
FIG. 1 illustrates an example execution of a single instance of a floating-point scalar comparison with flags instruction.

FIG. 1 illustrates an example execution of a single instance of a floating-point scalar comparison with flags instruction. While this illustration is in little endian format, the principles discussed herein work in big endian format.

As shown, in response to a decoded a floating-point scalar comparison with flags instruction, execution circuitry 101 evaluates two floating-point values (one from a first source 111 and one from a second source 113) and sets one or more flags of a flags register 121 based on the result of the evaluation. The evaluation is performed by comparing both floating-point values and determining if at least one of the floating-point values is not a number (NaN), in which case the relationship is unordered. Otherwise the relationship will be one of less-than, equal-to, or greater-than. In particular, floating-point compare instruction circuitry 102 performs the evaluation.

In some examples, the floating-point compare instruction circuitry 102 comprises a plurality of selectable, based on opcode, etc. comparison circuits. In some examples, a compare selector 131 is provided by decoder and/or scheduler circuitry. In some examples, this is part of a microoperation.

In this example, there are one or more comparison circuits such as IEEE FP16 (half-precision floating-point) compare circuitry 103, IEEE FP32 (single-precision floating-point) compare circuitry 105, IEEE FP64 (double-precision floating-point) compare circuitry 106, Bfloat16 compare circuitry 104, FP8 (8-bit floating point—either a 1-5-2 or 1-4-3 format) compare circuitry 107, and FP4 compare circuitry 108.

In some examples, flags are organized into the flags register 121 where each individual flag bit corresponds to a bit position in the register. In some examples, CF is bit 0, PF is bit 2, ZF is bit 6, SF is bit 7, and OF is bit 11. Note that OF is an overflow flag, SF is a sign flag, ZF is a zero flag, PF is a parity flag, and CF is a carry flag. Flags are called condition codes in some examples.

Flag writing circuitry 109 writes flags in the flags register 121 based on the output of the selected compare circuitry. In some examples, flags of the flags register 121 are set as follows (where A is the first source and B is the second source):

| Relationship | FLAG bit settings |
| --- | --- |
| A > B | OF = 0 SF = 0 ZF = 0 PF = 0 CF = 0 |
| A = B | OF = 1 SF = 1 ZF = 1 PF = 0 CF = 0 |
| A < B | OF = 1 SF = 0 ZF = 0 PF = 0 CF = 1 |
| A unordered with B | OF = 1 SF = 1 ZF = 0 PF = 1 CF = 1 |

Execution circuitry 101 may include other circuitry 110 such as vector operation circuitry, ALU circuitry, load/store circuitry etc.

This execution of examples of a floating-point scalar comparison with flags instruction sets the OF, SF, ZF, PF, and CF flags in the EFLAGS register in response to the comparison of two floating-point values so that meaningful combinations of relationships can be determined using a single operation.

While some legacy comparisons clear the OF and SF flags unconditionally, examples of the floating-point scalar comparison with flags instruction set them to allow the less-than relationship to be checked using the comparison instructions that check for less than relationships (e.g., jump less than (JLR), jump less than or equal to (JLE), set less than (SETLT), set equal to or less than (SETLE), conditional move less than (CMOVLT), and conditional move less than or equal to (CMOVLE)).

While the greater-than relationship can be checked with the "above" relationship instructions like jump if above (JA), jump if above or equal (JAE), set if above (SETA), set if above or equal (SETA), conditional move above (CMOVA), and conditional move above or equal to (CMOVAE)).

The change in setting the ZF flag also allows testing for equality with equal or not equal instructions (e.g., JE, JNE, SETE, SEINE, CMOVE and CMOVNE instructions) without having to account for the unordered relationship. Although the "equal-to or unordered" relationship combination is almost never checked, the SF flag is set so this condition can also be checked if there is a reason to do so.

Examples of how flags are used by certain instructions is as follows.

| < | = | > | unordered | Conditional Branch | Flag Tests |
| --- | --- | --- | --- | --- | --- |
| | | | | NOP | none |
| | | | ✓ | JP | PF = 1 |
| | | ✓ | | JA | CF = 0 and ZF = 0 |
| | | ✓ | ✓ | JNLE | ZF = 0 and SF = OF |

-continued

| < | = | > | unordered | Conditional Branch | Flag Tests |
| --- | --- | --- | --- | --- | --- |
| | ✓ | | | JE | ZF = 1 |
| | ✓ | | ✓ | JS | SF = 1 |
| | ✓ | ✓ | | JAE | CF = 0 |
| | ✓ | ✓ | ✓ | JNL | SF = OF |
| ✓ | | | | JL | SF ≠ OF |
| ✓ | | | ✓ | JNAE | CF = 1 |
| ✓ | | ✓ | | JNS | SF = 0 |
| ✓ | | ✓ | ✓ | JNE | ZF = 0 |
| ✓ | ✓ | | | JLE | ZF = 1 or SF ≠ OF |
| ✓ | ✓ | | ✓ | JNA | CF = 1 or ZF = 1 |
| ✓ | ✓ | ✓ | | JNP | PF = 0 |
| ✓ | ✓ | ✓ | ✓ | JMP | none |

In some examples, the first source 111 and the second source 113 are registers. In some examples, the first source 111 is a register and the second source 113 is a memory location. In some examples, the sources 111 and 113 store packed (vector or SIMD) data and a data element from only one common data element position of the sources 111 and 113 is evaluated. For example, only the data element of the least significant data element position. In some examples, the sources 111 and 113 are scalar and only store one data element.

Figure 2:
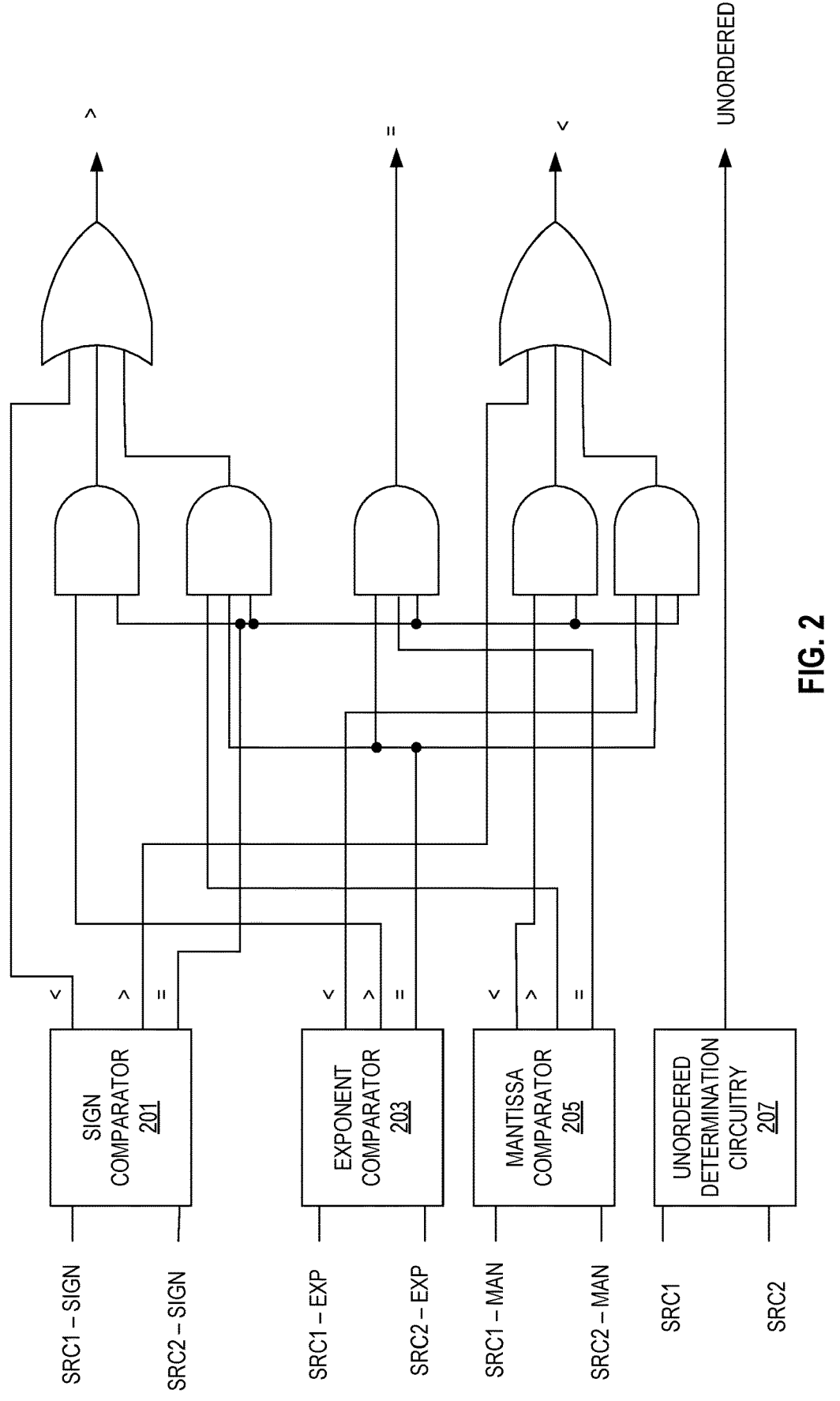
FIG. 2 illustrates examples of comparison circuitry.

FIG. 2 illustrates examples of comparison circuitry. As shown, a sign comparator circuit 201 takes in a sign bit from source 1 and source 2 (e.g., the most significant bit) and is a 1-bit comparator that compares them for <, >, and =. An exponent comparator circuit 203 takes in exponent bits from source 1 and source 2 and is a multi-bit comparator that compares them for <, >, and =. Note the number of bits to compare varies based on the floating-point value being compared (e.g., FP16 and FP32 have different number of exponent and fraction/mantissa (fraction+implicit) bits). A mantissa comparator circuit 205 takes in mantissa bits from source 1 and source 2 and is a multi-bit comparator that compares them for <, >, and =. Note the number of bits to compare varies based on the floating-point value being compared (e.g., FP16 and FP32 have different number of exponent and fraction/mantissa (fraction+implicit) bits). In some examples, unordered determination circuitry 207 determines if either source 1 or source 2 is not-a-number.

In this example, a collection of one or more logic gates are coupled to some of the comparison circuitries to provide an indication of if source 1 is <, >, or = to source 2. Unordered may be determined separately. In some examples, unordered overrules any other output. For example, a regardless of is <, > or = if there is an unorder result that is the only indication output. In some examples, an encoded value is output. For example, bit 0=<, bit 1=>, bit 2==, and bit 3=unordered. Note that the choice of AND/OR gates is shown for simplicity, but NAND/NOR, etc. gates may be used.

An example of a format for a floating-point scalar comparison with flags instruction is VCOMXxx SRC1, SRC2. In some examples, VCOMXxx is the opcode mnemonic of the instruction where xx represents the data element type (e.g., FP16, FP32, etc.). SRC1 and SRC2 are fields for the source operands, such as location information for packed data registers identifiers and/or memory location information. In some examples, SRC1 is provided at least in part by REG 1144 and SRC2 is provided at least in part by R/M 1146. In some examples, SRC1 is provided at least in part by REG 1144 and SRC2 is provided at least in part by 'R/M 1146 and SIB BYTE 1104. In some examples, aspects of a prefix are also utilized such as a "R" or "B" field to extend the bits of REG 1144 ("R") and/or R/M 1146 ("B").

Figure 3:
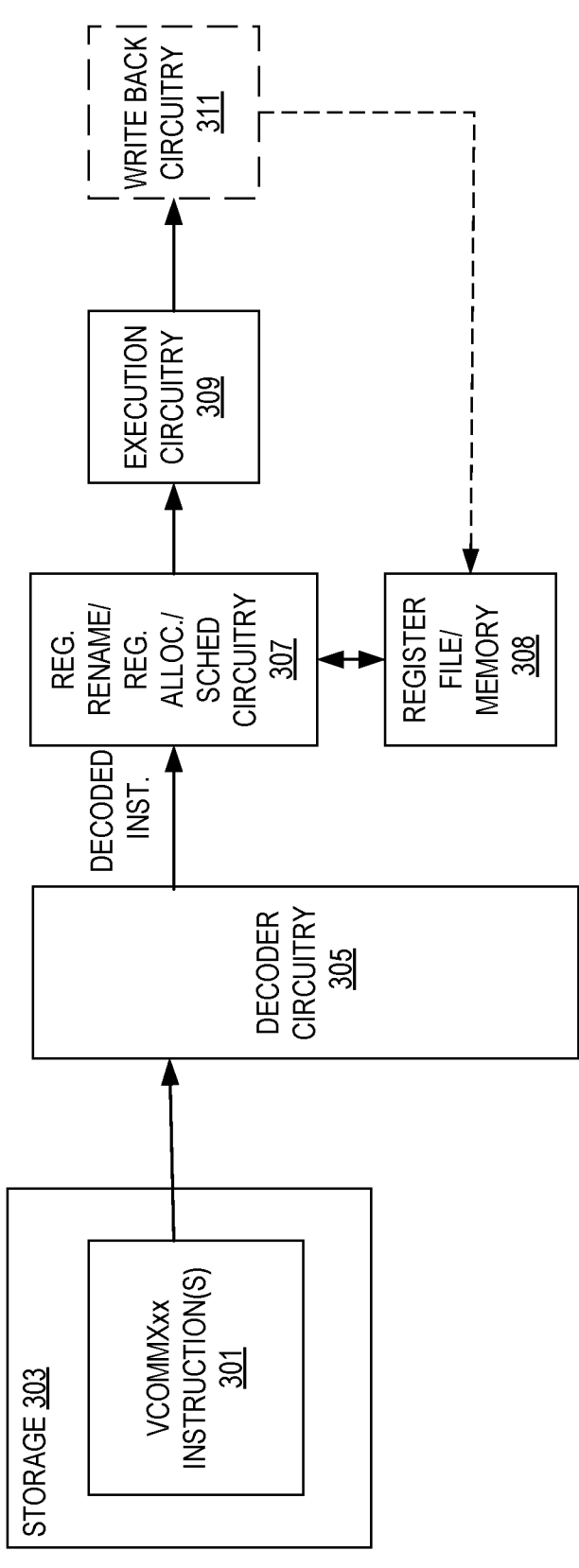
FIG. 3 illustrates examples of computing hardware to process a VCOMXxx instruction.

FIG. 3 illustrates examples of computing hardware to process a VCOMXxx instruction. As illustrated, storage 303 stores at least VCOMXxx instruction 301 to be executed. In some examples, storage 303 also stores one or more instructions that use the result of the VCOMXxx instruction.

The instruction 301 is received by decoder circuitry 305. For example, the decoder circuitry 305 receives this instruction from fetch circuitry (not shown). The instruction may be in any suitable format, such as that describe with reference to FIG. 10 below. In an example, the instruction includes fields for an opcode and two source operands. In some examples, the sources and destination are registers, and in other examples one or more are memory locations.

More detailed examples of at least one instruction format for the instruction will be detailed later. The decoder circuitry 305 decodes the instruction into one or more operations. In some examples, this decoding includes generating a plurality of micro-operations to be performed by execution circuitry (such as execution circuitry 309). The decoder circuitry 305 also decodes instruction prefixes.

In some examples, register renaming, register allocation, and/or scheduling circuitry 307 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 308 store data as operands of the instruction to be operated by execution circuitry 309. Example register types include packed data registers, general purpose registers (GPRs), and floating-point registers.

Execution circuitry 309 executes the decoded instruction. Example detailed execution circuitry includes execution circuitry 109 shown in FIG. 1, and execution cluster(s) 760 shown in FIG. 7(B), etc. The execution of the decoded instruction causes the execution circuitry to perform an unordered compare of at least one floating-point value of the each of the two source operands and stores a result of the comparison in a flags register (e.g., EFLAGS, RFLAGS, etc.) according to the following (where a first source is A and a second source is B).

| Relationship | FLAG bit settings |
|---|---|
| A > B | OF = 0 SF = 0 ZF = 0 PF = 0 CF = 0 |
| A = B | OF = 1 SF = 1 ZF = 1 PF = 0 CF = 0 |
| A < B | OF = 1 SF = 0 ZF = 0 PF = 0 CF = 1 |
| A unordered with B | OF = 1 SF = 1 ZF = 0 PF = 1 CF = 1 |

In some examples, retirement/write back circuitry 311 architecturally commits the destination register into the registers or memory 308 and retires the instruction.

FIG. 4 illustrates an example method to process an instance of a VCOMXxx instruction using circuitry, emulation, and/or binary translation. For example, a processor core as shown in FIG. 7(B), FIG. 1, FIG. 2, a pipeline and/or emulation/translation layer perform aspects of this method.

An instance of a single instruction (VCOMXxx) of an instruction set architecture is fetched at 401. The instance of the single instruction of the first instruction set architecture at least includes fields for an opcode and two source operand location information (e.g., memory addressing information and/or register identifier(s)). In some examples, the instruction further includes a prefix. In some examples, the instruction is fetched from an instruction cache. The opcode indicates execution circuitry, such as that detailed herein, is to perform an unordered compare of at least one floating-point value of the each of the two source operands and stores a result of the comparison in a flags register (e.g., EFLAGS, RFLAGS, etc.) according to the following (where a first identified source is A and a second identified source is B):

| Relationship | FLAG bit settings |
|---|---|
| A > B | OF = 0 SF = 0 ZF = 0 PF = 0 CF = 0 |
| A = B | OF = 1 SF = 1 ZF = 1 PF = 0 CF = 0 |
| A < B | OF = 1 SF = 0 ZF = 0 PF = 0 CF = 1 |
| A unordered with B | OF = 1 SF = 1 ZF = 0 PF = 1 CF = 1 |

In some examples, the first source is a register and the second source is a register. In some examples, the first source is a register and the second source is a memory location. The opcode may also indicate data types such as FP4, FP8, FP16, FP32, FP64, BF16, etc. In some examples, the sources store packed data (e.g., vector or SIMD data) and a data element of the least significant data element position of the sources is compared. In some examples, the sources are scalar and only store one FP value each.

Figure 16:
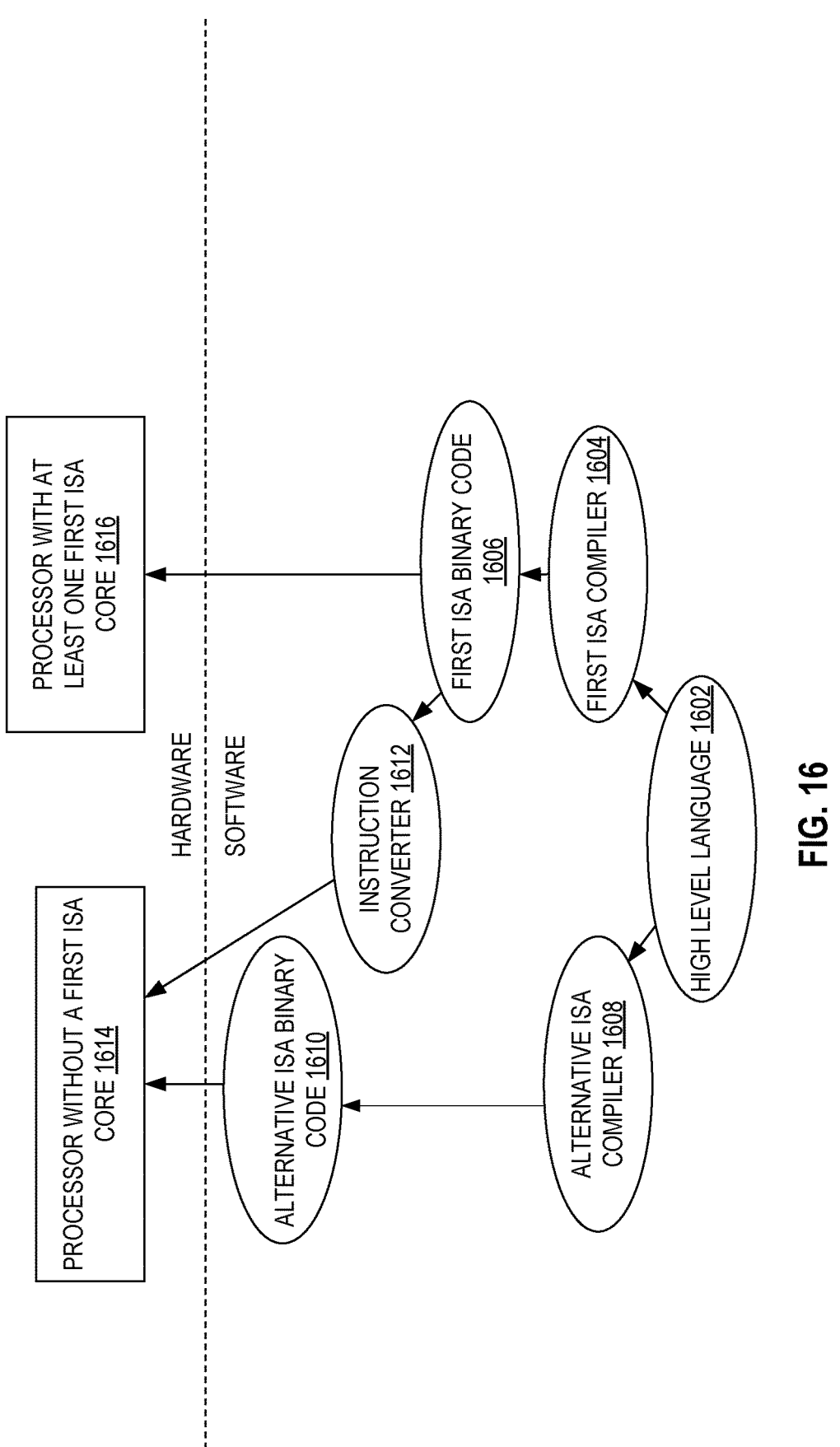
FIG. 16 is a block diagram illustrating the use of a software instruction converter to convert binary instructions in a source instruction set architecture to binary instructions in a target instruction set architecture according to examples.

The fetched single instruction of the instruction set architecture is translated into one or more instructions of a second, different instruction set architecture in some examples at 402. This translation is performed by a translation and/or emulation layer of software in some examples. In some examples, this translation is performed by an instruction converter 1612 as shown in FIG. 16. In some examples, the translation is performed by hardware translation circuitry.

The one or more translated instructions of the second, different instruction set architecture are decoded or the single instruction of the ISA is decoded at 403. For example, the translated instructions or single instruction are/is decoded by decoder circuitry such as decoder circuitry 305 or decode circuitry 740 detailed herein. In some examples, the operations of translation and decoding at 402 and 403 are merged.

Data values associated with the source operand(s) of the decoded instruction(s) of the second, different instruction set architecture or decoded single instruction are retrieved and the one or more instructions are scheduled at 405. For example, when one or more of the source operands are memory operands, the data from the indicated memory location is retrieved. The scheduling may include identifying a particular type of comparator to use.

At 407, the decoded instruction(s) of the second, different instruction set architecture or the decoded single instruction is/are executed by execution circuitry (hardware) such as one or more of execution circuitry 309 shown in FIG. 3, execution circuitry 101, execution circuitry 2, execution cluster(s) 760 shown in FIG. 7(B), etc. to perform the operation(s) indicated by the opcode of the single instruction of the first instruction set architecture. For the VCOMXxx instruction, the execution will cause execution circuitry to perform an unordered compare of at least one floating-point value of the each of the two source operands and stores a result of the comparison in a flags register (e.g., EFLAGS, RFLAGS, etc.) according to the following (where a first source is A and a second source is B).

| Relationship | FLAG bit settings |
|---|---|
| A > B | OF = 0 SF = 0 ZF = 0 PF = 0 CF = 0 |
| A = B | OF = 1 SF = 1 ZF = 1 PF = 0 CF = 0 |
| A < B | OF = 1 SF = 0 ZF = 0 PF = 0 CF = 1 |
| A unordered with B | OF = 1 SF = 1 ZF = 0 PF = 1 CF = 1 |

In some examples, the comparator to use is selected according to the opcode.

In some examples, the instruction(s) is/are committed or retired at 409.

Examples of computer architectures, pipelines, instruction formats, systems, etc. that support examples of VCOMXxx are detailed below.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 5:
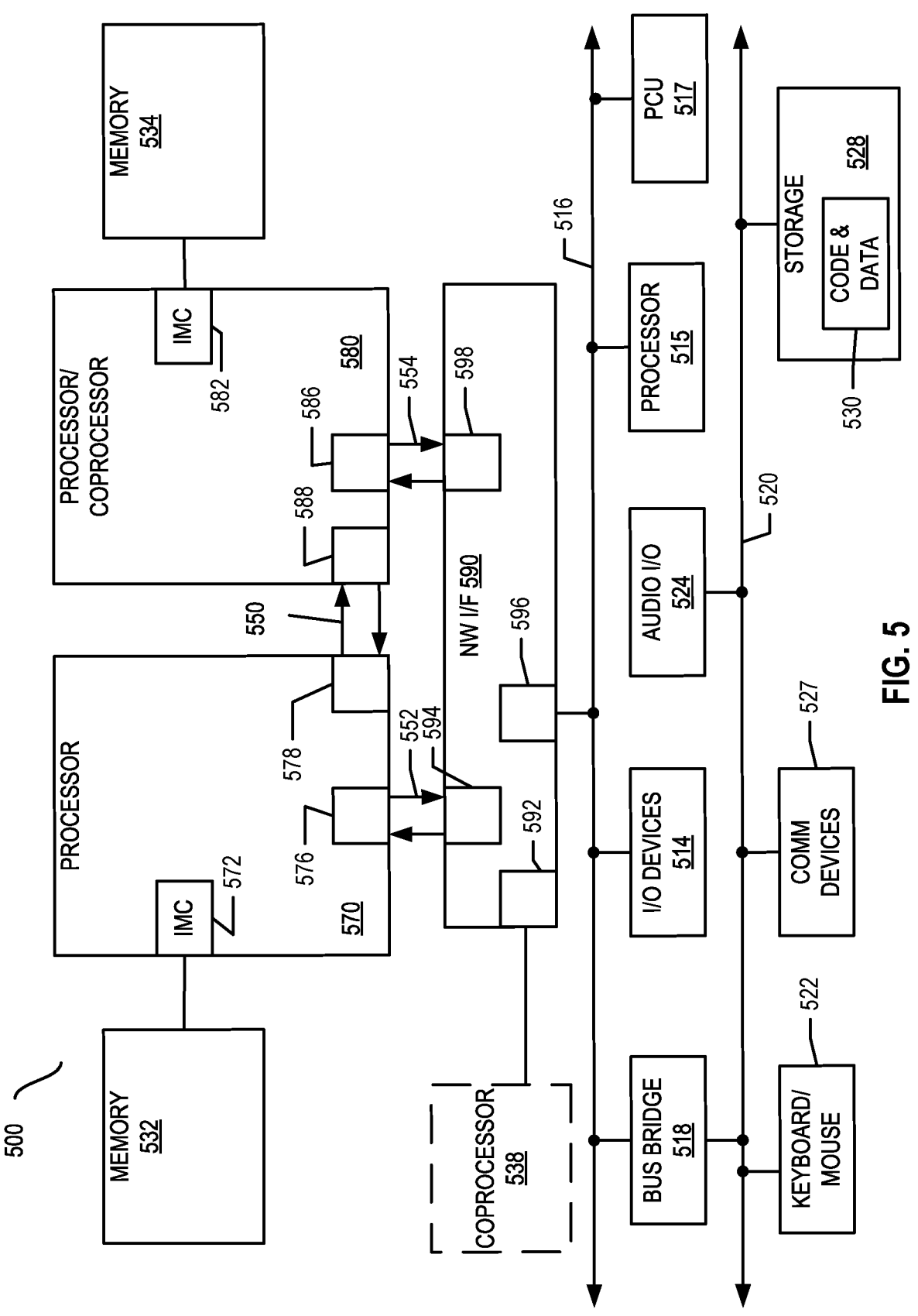
FIG. 5 illustrates an example computing system.

FIG. 5 illustrates an example computing system. Multiprocessor system 500 is an interfaced system and includes a plurality of processors or cores including a first processor 570 and a second processor 580 coupled via an interface 550 such as a point-to-point (P-P) interconnect, a fabric, and/or bus. In some examples, the first processor 570 and the second processor 580 are homogeneous. In some examples, first processor 570 and the second processor 580 are heterogenous. Though the example system 500 is shown to have two processors, the system may have three or more processors, or may be a single processor system. In some examples, the computing system is a system on a chip (SoC).

Processors 570 and 580 are shown including integrated memory controller (IMC) circuitry 572 and 582, respectively. Processor 570 also includes interface circuits 576 and 578; similarly, second processor 580 includes interface circuits 586 and 588. Processors 570, 580 may exchange information via the interface 550 using interface circuits 578, 588. IMCs 572 and 582 couple the processors 570, 580 to respective memories, namely a memory 532 and a memory 534, which may be portions of main memory locally attached to the respective processors.

Processors 570, 580 may each exchange information with a network interface (NW I/F) 590 via individual interfaces 552, 554 using interface circuits 576, 594, 586, 598. The network interface 590 (e.g., one or more of an interconnect, bus, and/or fabric, and in some examples is a chipset) may optionally exchange information with a coprocessor 538 via an interface circuit 592. In some examples, the coprocessor 538 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 570, 580 or outside of both processors, yet connected with the processors via an interface such as P-P interconnect, such that either or both processors' local cache information may be stored in the shared cache if a processor is placed into a low power mode.

Network interface 590 may be coupled to a first interface 516 via interface circuit 596. In some examples, first interface 516 may be an interface such as a Peripheral Component Interconnect (PCI) interconnect, a PCI Express interconnect or another I/O interconnect. In some examples, first interface 516 is coupled to a power control unit (PCU) 517, which may include circuitry, software, and/or firmware to perform power management operations with regard to the processors 570, 580 and/or co-processor 538. PCU 517 provides control information to a voltage regulator (not shown) to cause the voltage regulator to generate the appropriate regulated voltage. PCU 517 also provides control information to control the operating voltage generated. In various examples, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other examples, power management operations to be performed by PCU 517 may be implemented externally to a processor, such as by way of a separate power management integrated circuit (PMIC) or another component external to the processor. In yet other examples, power management operations to be performed by PCU 517 may be implemented within BIOS or other system software.

Various I/O devices 514 may be coupled to first interface 516, along with a bus bridge 518 which couples first interface 516 to a second interface 520. In some examples, one or more additional processor(s) 515, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 516. In some examples, second interface 520 may be a low pin count (LPC) interface. Various devices may be coupled to second interface 520 including, for example, a keyboard and/or mouse 522, communication devices 527 and storage circuitry 528. Storage circuitry 528 may be one or more non-transitory machine-readable storage media as described below, such as a disk drive or other mass storage device which may include instructions/code and data 530 and may implement the storage 303 in some examples. Further, an audio I/O 524 may be coupled to second interface 520. Note that other architectures than the point-to-point architecture described above are possible. For example, instead of the point-to-point architecture, a system such as multiprocessor system 500 may implement a multidrop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 6:
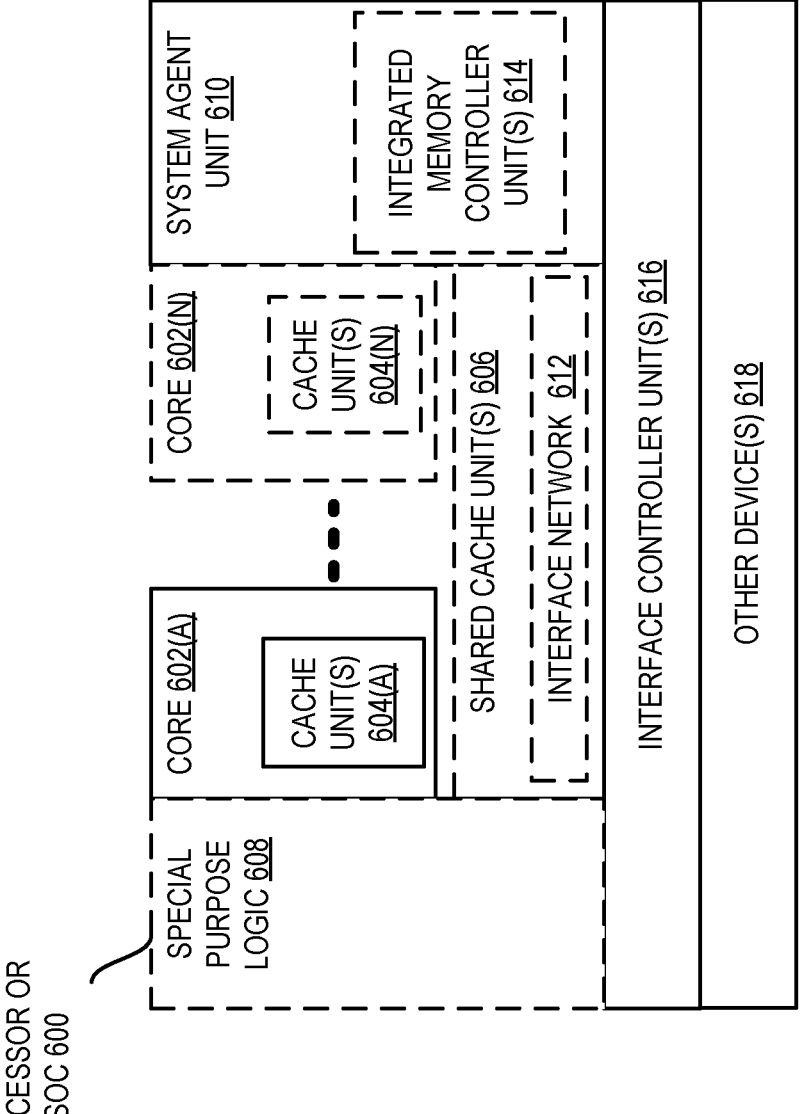
FIG. 6 illustrates a block diagram of an example processor and/or System on a Chip (SoC) that may have one or more cores and an integrated memory controller.

FIG. 6 illustrates a block diagram of an example processor and/or SoC 600 that may have one or more cores and an integrated memory controller. The solid lined boxes illustrate a processor 600 with a single core 602(A), system agent unit circuitry 610, and a set of one or more interface controller unit(s) circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interface controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 604(A)-(N) within the cores 602(A)-(N), a set of one or more shared cache unit(s) circuitry 606, and external memory (not shown) coupled to the set of integrated memory controller unit(s) circuitry 614. The set of one or more shared cache unit(s) circuitry 606 may include one or more mid-level caches, such as level 2 (L2), level 3 (L3), level 4 (L4), or other levels of cache, such as a last level cache (LLC), and/or combinations thereof. While in some examples interface network circuitry 612 (e.g., a ring interconnect) interfaces the special purpose logic 608 (e.g., integrated graphics logic), the set of shared cache unit(s) circuitry 606, and the system agent unit circuitry 610, alternative examples use any number of well-known techniques for interfacing such units. In some examples, coherency is maintained between one or more of the shared cache unit(s) circuitry 606 and cores 602(A)-(N). In some examples, interface controller units circuitry 616 couple the cores 602 to one or more other devices 618 such as one or more I/O devices, storage, one or more communication devices (e.g., wireless networking, wired networking, etc.), etc.

In some examples, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous in terms of instruction set architecture (ISA). Alternatively, the cores 602(A)-(N) may be heterogeneous in terms of ISA; that is, a subset of the cores 602(A)-(N) may be capable of executing an ISA, while other cores may be capable of executing only a subset of that ISA or another ISA.

Example Core Architectures—In-order and out-of-order core block diagram.

Figure 7A:
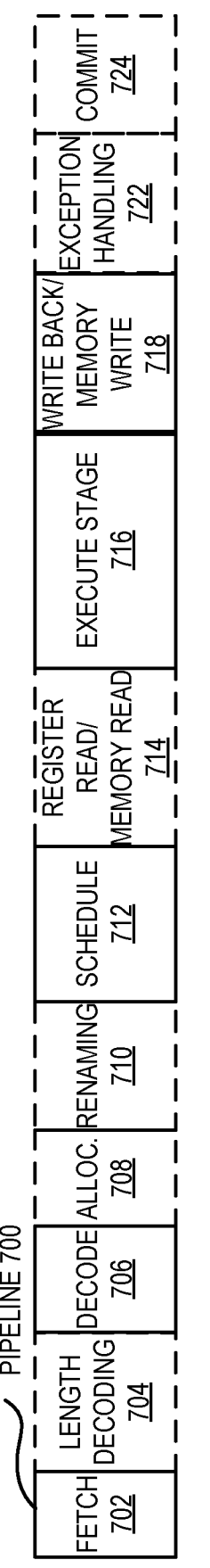
FIG. 7(A) is a block diagram illustrating both an example in-order pipeline and an example register renaming, out-of-order issue/execution pipeline according to examples.
Figure 7B:
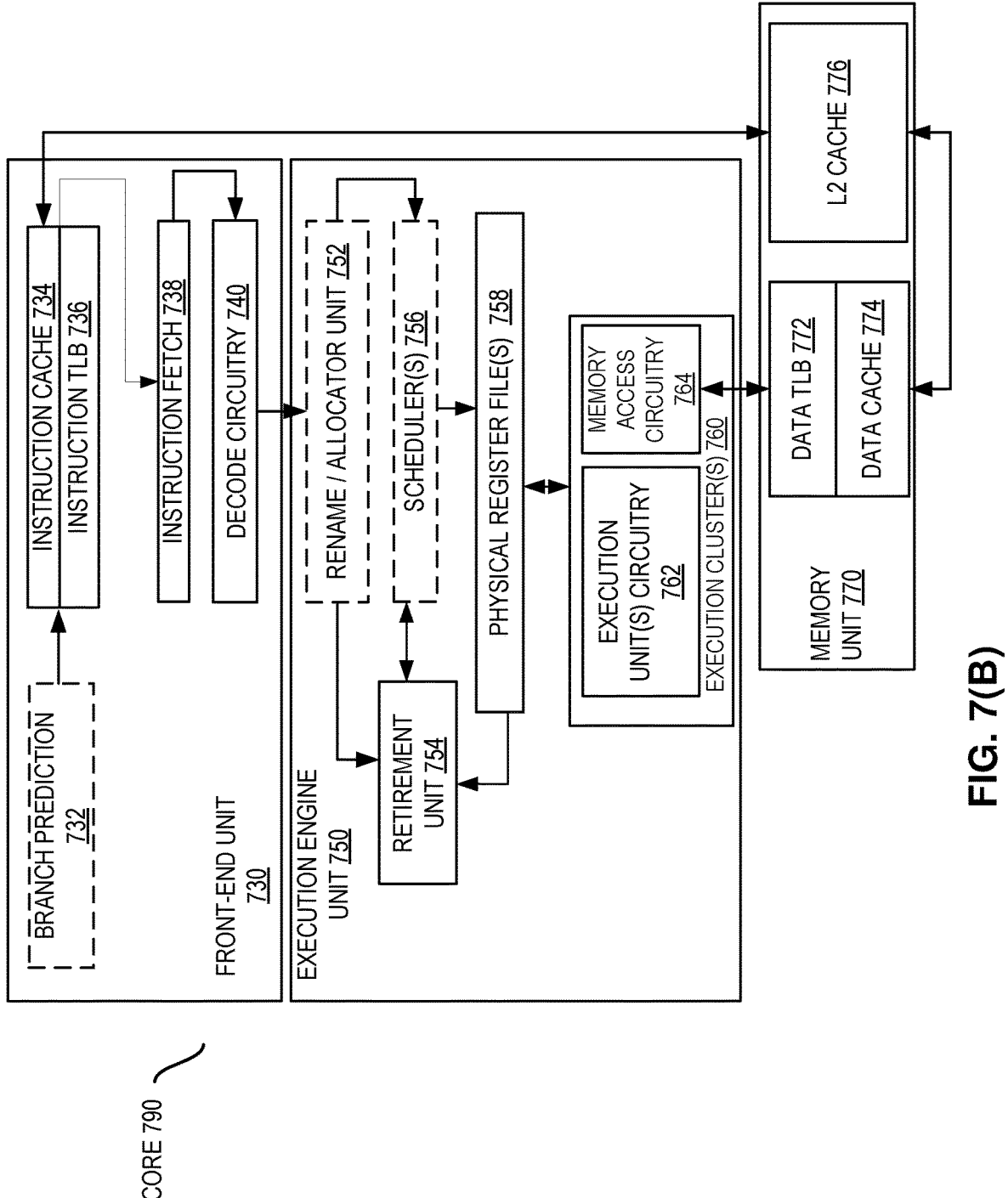
FIG. 7(B) is a block diagram illustrating both an example in-order architecture core and an example register renaming, out-of-order issue/execution architecture core to be included in a processor according to examples.

FIG. 7(A) is a block diagram illustrating both an example in-order pipeline and an example register renaming, out-of-order issue/execution pipeline according to examples. FIG. 7(B) is a block diagram illustrating both an example in-order architecture core and an example register renaming, out-of-order issue/execution architecture core to be included in a processor according to examples. The solid lined boxes in FIGS. 7(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7(A), a processor pipeline 700 includes a fetch stage 702, an optional length decoding stage 704, a decode stage 706, an optional allocation (Alloc) stage 708, an optional renaming stage 710, a schedule (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, and during the decode stage 706, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 706 and the register read/memory read stage 714 may be combined into one pipeline stage. In one example, during the execute stage 716, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 7(B) may implement the pipeline 700 as follows: 1) the instruction fetch circuitry 738 performs the fetch and length decoding stages 702 and 704; 2) the decode circuitry 740 performs the decode stage 706; 3) the rename/allocator unit circuitry 752 performs the allocation stage 708 and renaming stage 710; 4) the scheduler(s) circuitry 756 performs the schedule stage 712; 5) the physical register file(s) circuitry 758 and the memory unit circuitry 770 perform the register read/memory read stage 714; the execution cluster(s) 760 perform the execute stage 716; 6) the memory unit circuitry 770 and the physical register file(s) circuitry 758 perform the write back/memory write stage 718; 7) various circuitry may be involved in the exception handling stage 722; and 8) the retirement unit circuitry 754 and the physical register file(s) circuitry 758 perform the commit stage 724.

FIG. 7(B) shows a processor core 790 including front-end unit circuitry 730 coupled to execution engine unit circuitry 750, and both are coupled to memory unit circuitry 770. The core 790 may be a reduced instruction set architecture computing (RISC) core, a complex instruction set architecture computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit circuitry 730 may include branch prediction circuitry 732 coupled to instruction cache circuitry 734, which is coupled to an instruction translation lookaside buffer (TLB) 736, which is coupled to instruction fetch circuitry 738, which is coupled to decode circuitry 740. In one example, the instruction cache circuitry 734 is included in the memory unit circuitry 770 rather than the front-end circuitry 730. The decode circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 740 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM (not shown) or other medium that stores microcode for certain macroinstructions (e.g., in decode circuitry 740 or otherwise within the front-end circuitry 730). In one example, the decode circuitry 740 includes a micro-operation (micro-op) or operation cache (not shown) to hold/cache decoded operations, micro-tags, or micro-operations generated during the decode or other stages of the processor pipeline 700. The decode circuitry 740 may be coupled to rename/allocator unit circuitry 752 in the execution engine circuitry 750.

The execution engine circuitry 750 includes the rename/allocator unit circuitry 752 coupled to retirement unit circuitry 754 and a set of one or more scheduler(s) circuitry 756. The scheduler(s) circuitry 756 represents any number of different schedulers, including reservations stations, central instruction window, etc. In some examples, the scheduler(s) circuitry 756 can include arithmetic logic unit (ALU) scheduler/scheduling circuitry, ALU queues, address generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 758 includes vector registers unit circuitry, writemask registers unit circuitry, and scalar register unit circuitry. These register units may provide architectural vector registers, vector mask registers, general-purpose registers, etc. The physical register file(s) circuitry 758 is coupled to the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution unit(s) circuitry 762 and a set of one or more memory access circuitry 764. The execution unit(s) circuitry 762 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 756, physical register file(s) circuitry 758, and execution cluster(s) 760 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 764). It should also be understood that where separate pipelines are used, one or more of these pipelines may be out-of-order issue/execution and the rest in-order.

In some examples, the execution engine unit circuitry 750 may perform load store unit (LSU) address/data pipelining to an Advanced Microcontroller Bus (AMB) interface (not shown), and address phase and writeback, data phase load, store, and branches.

The set of memory access circuitry 764 is coupled to the memory unit circuitry 770, which includes data TLB circuitry 772 coupled to data cache circuitry 774 coupled to level 2 (L2) cache circuitry 776. In one example, the memory access circuitry 764 may include load unit circuitry, store address unit circuitry, and store data unit circuitry, each of which is coupled to the data TLB circuitry 772 in the memory unit circuitry 770. The instruction cache circuitry 734 is further coupled to the level 2 (L2) cache circuitry 776 in the memory unit circuitry 770. In one example, the instruction cache 734 and the data cache 774 are combined into a single instruction and data cache (not shown) in L2 cache circuitry 776, level 3 (L3) cache circuitry (not shown), and/or main memory. The L2 cache circuitry 776 is coupled to one or more other levels of cache and eventually to a main memory.

The core 790 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 790 includes logic to support a packed data instruction set architecture extension (e.g., AVX1, AVX2), thereby allowing the operations used by many multimedia applications to be performed using packed data.

Example Execution Unit(s) Circuitry.

Figure 8:
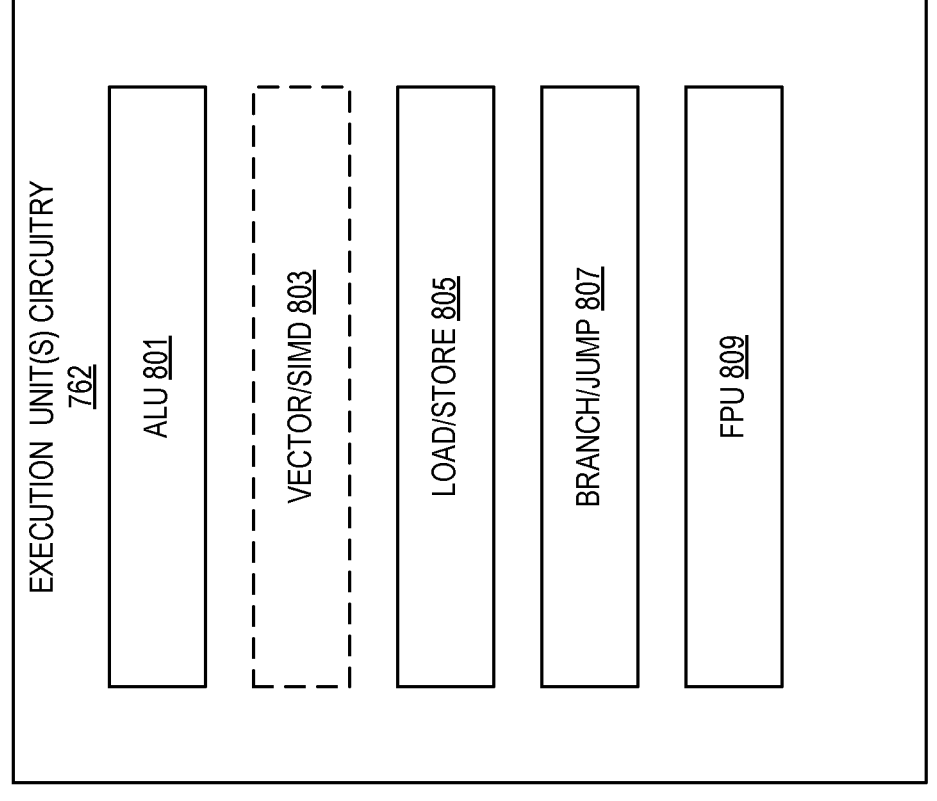
FIG. 8 illustrates examples of execution unit(s) circuitry.

FIG. 8 illustrates examples of execution unit(s) circuitry, such as execution unit(s) circuitry 762 of FIG. 7(B). As illustrated, execution unit(s) circuitry 762 may include one or more ALU circuits 801, optional vector/single instruction multiple data (SIMD) circuits 803, load/store circuits 805, branch/jump circuits 807, and/or Floating-point unit (FPU) circuits 809. ALU circuits 801 perform integer arithmetic and/or Boolean operations. Vector/SIMD circuits 803 perform vector/SIMD operations on packed data (such as SIMD/vector registers). Load/store circuits 805 execute load and store instructions to load data from memory into registers or store from registers to memory. Load/store circuits 805 may also generate addresses. Branch/jump circuits 807 cause a branch or jump to a memory address depending on the instruction. FPU circuits 809 perform floating-point arithmetic. The width of the execution unit(s) circuitry 762 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

FIG. 9 is a block diagram of a register architecture 900 according to some examples. As illustrated, the register architecture 900 includes vector/SIMD registers 910 that vary from 128-bit to 1,024 bits width. In some examples, the vector/SIMD registers 910 are physically 512-bits and, depending upon the mapping, only some of the lower bits are used. For example, in some examples, the vector/SIM D registers 910 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 900 includes writemask/predicate registers 915. For example, in some examples, there are 8 writemask/predicate registers (sometimes called k0 through k7) that are each 16-bit, 32-bit, 64-bit, or 128-bit in size. Writemask/predicate registers 915 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 915 corresponds to a data element position of the destination. In other examples, the writemask/predicate registers 915 are scalable and consists of a set number of enable bits for a given vector element (e.g., 8 enable bits per 64-bit vector element).

The register architecture 900 includes a plurality of general-purpose registers 925. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 900 includes scalar floating-point (FP) register file 945 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 940 (e.g., EFLAGS, RFLAGS, etc.) store status and control information for arithmetic, compare, and system operations. For example, the one or more flag registers 940 may store condition code information such as carry, parity, auxiliary carry, zero, sign, and overflow. In some examples, the one or more flag registers 940 are called program status and control registers.

Segment registers 920 contain segment points for use in accessing memory. In some examples, these registers are referenced by the names CS, DS, SS, ES, FS, and GS.

Model specific registers or machine specific registers (MSRs) 935 control and report on processor performance. Most MSRs 935 handle system-related functions and are not accessible to an application program. For example, MSRs may provide control for one or more of: performance-monitoring counters, debug extensions, memory type range registers, thermal and power management, instruction-specific support, and/or processor feature/mode support. Machine check registers 960 consist of control, status, and error reporting MSRs that are used to detect and report on hardware errors. Control register(s) 955 (e.g., CR0-CR4) determine the operating mode of a processor (e.g., processor 570, 580, 538, 515, and/or 600) and the characteristics of a currently executing task. In some examples, MSRs 935 are a subset of control registers 955.

One or more instruction pointer register(s) 930 store an instruction pointer value. Debug registers 950 control and allow for the monitoring of a processor or core's debugging operations.

Memory (nnenn) management registers 965 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 900 may, for example, be used in register file/memory 308, or physical register file(s) circuitry 7 58.

Instruction set architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 10:
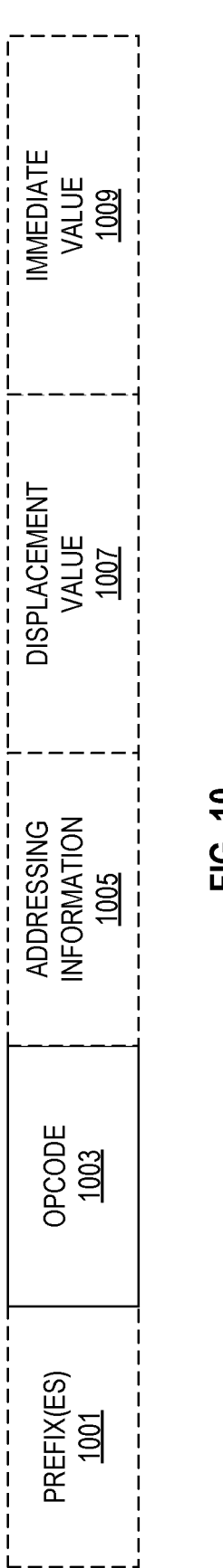
FIG. 10 illustrates examples of an instruction format.

FIG. 10 illustrates examples of an instruction format. As illustrated, an instruction may include multiple components including, but not limited to, one or more fields for: one or more prefixes 1001, an opcode 1003, addressing information 1005 (e.g., register identifiers, memory addressing information, etc.), a displacement value 1007, and/or an immediate value 1009. Note that some instructions utilize some or all the fields of the format whereas others may only use the field for the opcode 1003. In some examples, the order illustrated is the order in which these fields are to be encoded, however, it should be appreciated that in other examples these fields may be encoded in a different order, combined, etc.

The prefix(es) field(s) 1001, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1003 is used to at least partially define the operation to be performed upon a decoding of the instruction. In some examples, a primary opcode encoded in the opcode field 1003 is one, two, or three bytes in length. In other examples, a primary opcode can be a different length. An additional 3-bit opcode field is sometimes encoded in another field.

Figure 11:
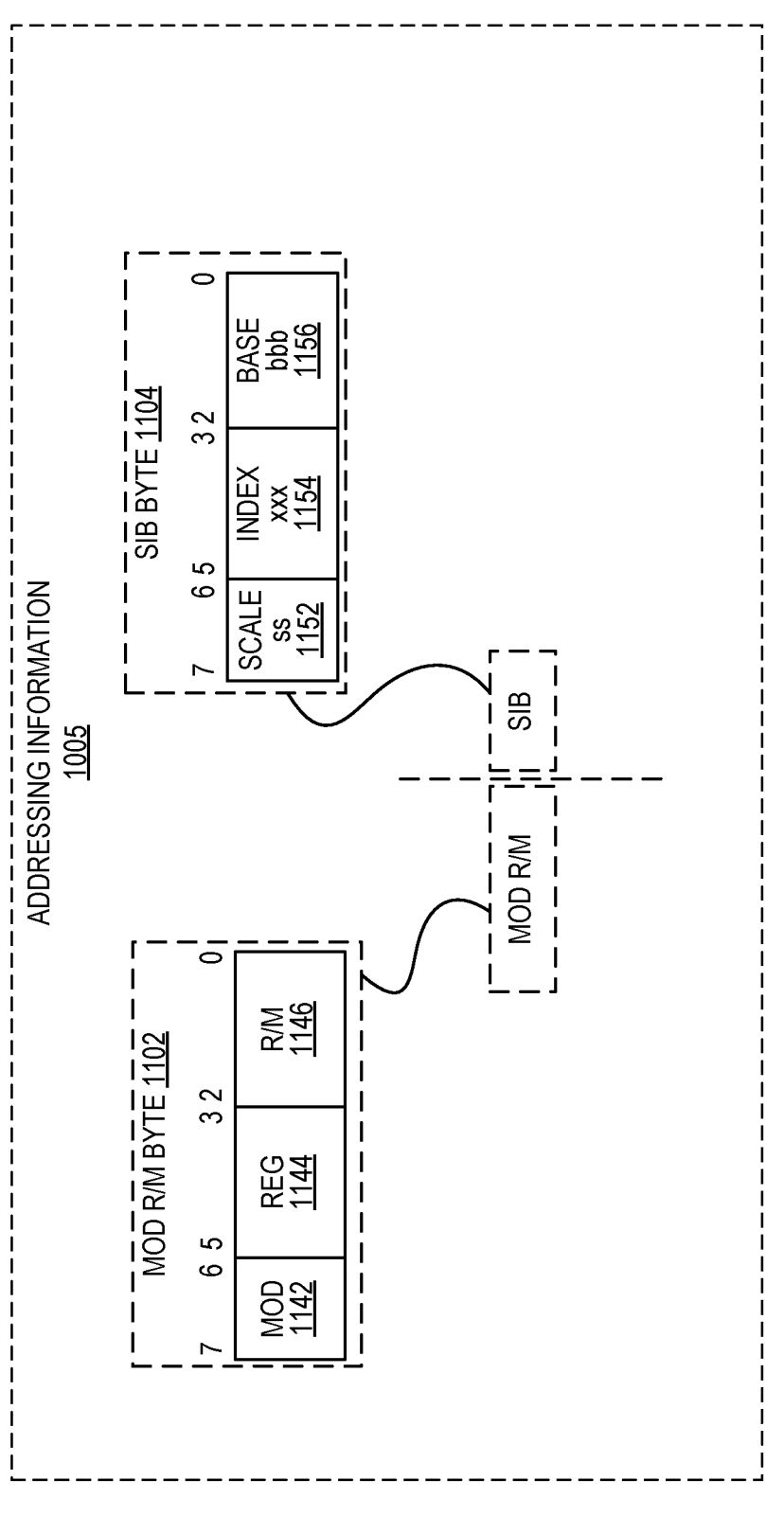
FIG. 11 illustrates examples of an addressing information field.

The addressing information field 1005 is used to address one or more operands of the instruction, such as a location in memory or one or more registers. FIG. 11 illustrates examples of the addressing information field 1005. In this illustration, an optional MOD R/M byte 1102 and an optional Scale, Index, Base (SIB) byte 1104 are shown. The MOD R/M byte 1102 and the SIB byte 1104 are used to encode up to two operands of an instruction, each of which is a direct register or effective memory address. Note that both of these fields are optional in that not all instructions include one or more of these fields. The MOD R/M byte 1102 includes a MOD field 1142, a register (reg) field 1144, and R/M field 1146.

The content of the MOD field 1142 distinguishes between memory access and non-memory access modes. In some examples, when the MOD field 1142 has a binary value of 11 (11b), a register-direct addressing mode is utilized, and otherwise a register-indirect addressing mode is used.

The register field 1144 may encode either the destination register operand or a source register operand or may encode an opcode extension and not be used to encode any instruction operand. The content of register field 1144, directly or through address generation, specifies the locations of a source or destination operand (either in a register or in memory). In some examples, the register field 1144 is supplemented with an additional bit from a prefix (e.g., prefix 1001) to allow for greater addressing.

The R/M field 1146 may be used to encode an instruction operand that references a memory address or may be used to encode either the destination register operand or a source register operand. Note the R/M field 1146 may be combined with the MOD field 1142 to dictate an addressing mode in some examples.

The SIB byte 1104 includes a scale field 1152, an index field 1154, and a base field 1156 to be used in the generation of an address. The scale field 1152 indicates a scaling factor. The index field 1154 specifies an index register to use. In some examples, the index field 1154 is supplemented with an additional bit from a prefix (e.g., prefix 1001) to allow for greater addressing. The base field 1156 specifies a base register to use. In some examples, the base field 1156 is supplemented with an additional bit from a prefix (e.g., prefix 1001) to allow for greater addressing. In practice, the content of the scale field 1152 allows for the scaling of the content of the index field 1154 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1007 provides this value. Additionally, in some examples, a displacement factor usage is encoded in the MOD field of the addressing information field 1005 that indicates a compressed displacement scheme for which a displacement value is calculated and stored in the displacement field 1007.

In some examples, the immediate value field 1009 specifies an immediate value for the instruction. An immediate value may be encoded as a 1-byte value, a 2-byte value, a 4-byte value, etc.

Figures 12, 13A, 13B, 13C, 13D:
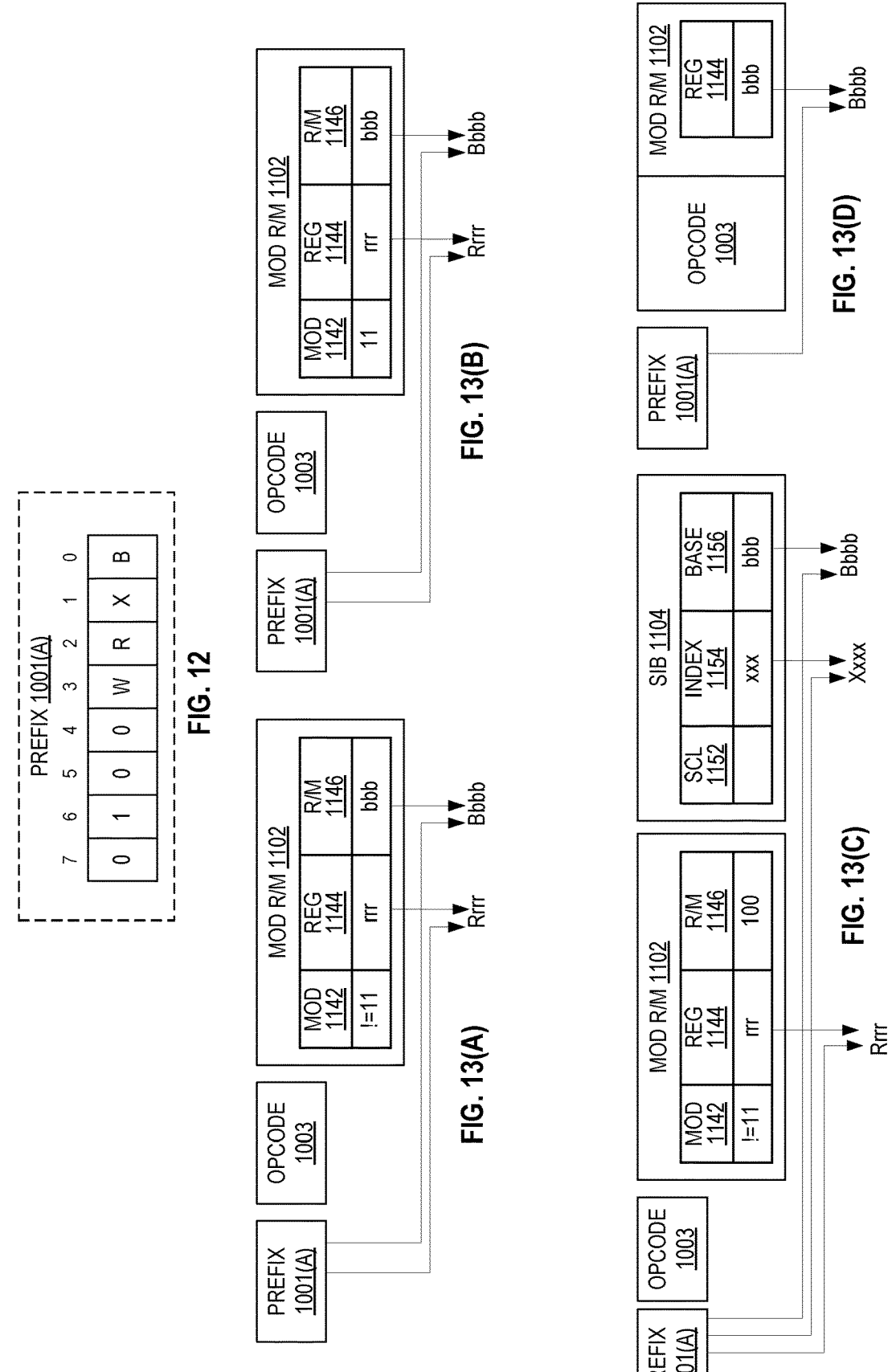
FIG. 12 illustrates examples of a first prefix.
FIGS. 13(A)-(D) illustrate examples of how the R, X, and B fields of the first prefix in FIG. 12 are used.

FIG. 12 illustrates examples of a first prefix 1001(A). In some examples, the first prefix 1001(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1001(A) may specify up to three registers using 3-bit fields depending on the format: 1) using the reg field 1144 and the R/M field 1146 of the MOD R/M byte 1102; 2) using the MOD R/M byte 1102 with the SIB byte 1104 including using the reg field 1144 and the base field 1156 and index field 1154; or 3) using the register field of an opcode.

In the first prefix 1001(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1144 and MOD R/M R/M field 1146 alone can each only address 8 registers.

In the first prefix 1001(A), bit position 2 (R) may be an extension of the MOD R/M reg field 1144 and may be used to modify the MOD R/M reg field 1144 when that field encodes a general-purpose register, a 64-bit packed data register (e.g., a SSE register), or a control or debug register. R is ignored when MOD R/M byte 1102 specifies other registers or defines an extended opcode.

Bit position 1 (X) may modify the SIB byte index field 1154.

Bit position 0 (B) may modify the base in the MOD R/M R/M field 1146 or the SIB byte base field 1156; or it may modify the opcode register field used for accessing general purpose registers (e.g., general purpose registers 925).

FIGS. 13(A)-(D) illustrate examples of how the R, X, and B fields of the first prefix 1001(A) are used. FIG. 13(A) illustrates R and B from the first prefix 1001(A) being used to extend the reg field 1144 and R/M field 1146 of the MOD R/M byte 1102 when the SIB byte 11 04 is not used for memory addressing. FIG. 13(B) illustrates R and B from the first prefix 1001(A) being used to extend the reg field 1144 and R/M field 1146 of the MOD R/M byte 1102 when the SIB byte 11 04 is not used (register-register addressing). FIG. 13(C) illustrates R, X, and B from the first prefix 1001(A) being used to extend the reg field 1144 of the MOD R/M byte 1102 and the index field 1154 and base field 1156 when the SIB byte 11 04 being used for memory addressing. FIG. 13(D) illustrates B from the first prefix 1001(A) being used to extend the reg field 1144 of the MOD R/M byte 1102 when a register is encoded in the opcode 1003.

Figures 14A, 14B:
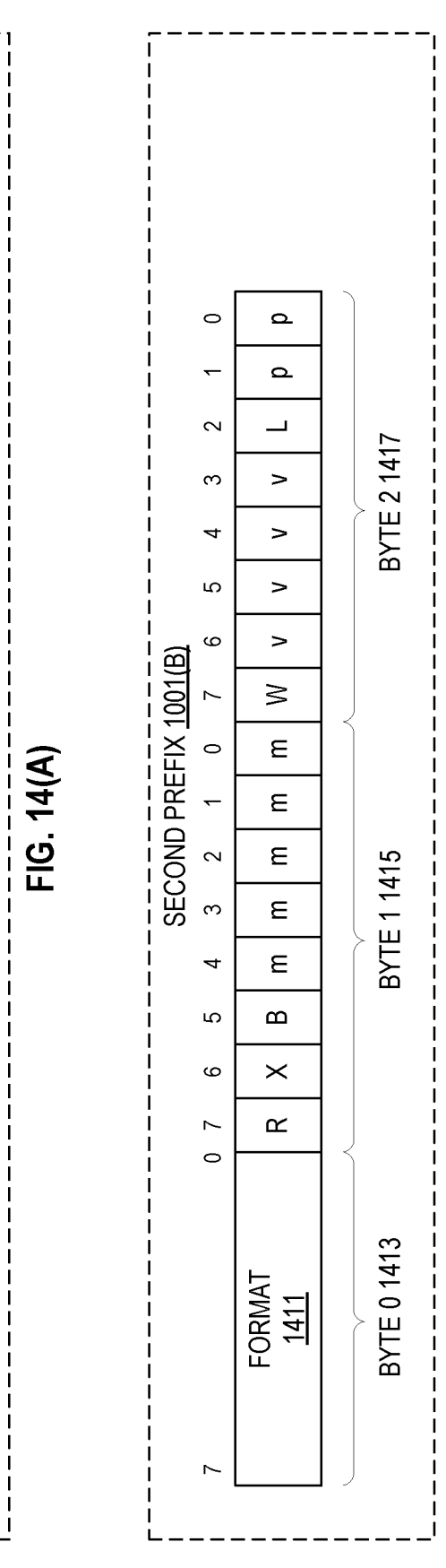
FIGS. 14(A)-(B) illustrate examples of a second prefix.

FIGS. 14(A)-(B) illustrate examples of a second prefix 1001(B). In some examples, the second prefix 1001(B) is an example of a VEX prefix. The second prefix 1001(B) encoding allows instructions to have more than two operands, and allows SIMD vector registers (e.g., vector/SIMD registers 910) to be longer than 64-bits (e.g., 128-bit and 256-bit). The use of the second prefix 1001(B) provides for three-operand (or more) syntax. For example, previous two-operand instructions performed operations such as A=A+B, which overwrites a source operand. The use of the second prefix 1001(B) enables operands to perform nondestructive operations such as A=B+C.

In some examples, the second prefix 1001(B) comes in two forms—a two-byte form and a three-byte form. The two-byte second prefix 1001(B) is used mainly for 128-bit, scalar, and some 256-bit instructions; while the three-byte second prefix 1001(B) provides a compact replacement of the first prefix 1001(A) and 3-byte opcode instructions.

FIG. 14(A) illustrates examples of a two-byte form of the second prefix 1001(B). In one example, a format field 1401 (byte 0 1403) contains the value CSH. In one example, byte 1 1405 includes an "R" value in bit[7]. This value is the complement of the "R" value of the first prefix 1001(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1146 to encode the instruction operand that references a memory address or encode either the destination register operand or a source register operand.

Instructions that use this prefix may use the MOD R/M reg field 1144 to encode either the destination register operand or a source register operand, or to be treated as an opcode extension and not used to encode any instruction operand.

For instruction syntax that support four operands, vvvv, the MOD R/M R/M field 1146 and the MOD R/M reg field 1144 encode three of the four operands. Bits[7:4] of the immediate value field 1009 are then used to encode the third source register operand.

FIG. 14(B) illustrates examples of a three-byte form of the second prefix 1001(B). In one example, a format field 1411 (byte 0 1413) contains the value C4H. Byte 1 1415 includes in bits[7:5] "R," "X," and "B" which are the complements of the same values of the first prefix 1001(A). Bits[4:0] of byte 1 1415 (shown as mmmmm) include content to encode, as need, one or more implied leading opcode bytes. For example, 00001 implies a OFH leading opcode, 00010 implies a 0F38H leading opcode, 00011 implies a 0F3AH leading opcode, etc.

Bit[7] of byte 2 1417 is used similar to W of the first prefix 1001(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1146 to encode the instruction operand that references a memory address or encode either the destination register operand or a source register operand.

Instructions that use this prefix may use the MOD R/M reg field 1144 to encode either the destination register operand or a source register operand, or to be treated as an opcode extension and not used to encode any instruction operand.

For instruction syntax that support four operands, vvvv, the MOD R/M R/M field 1146, and the MOD R/M reg field 1144 encode three of the four operands. Bits[7:4] of the immediate value field 1009 are then used to encode the third source register operand.

Figure 15:
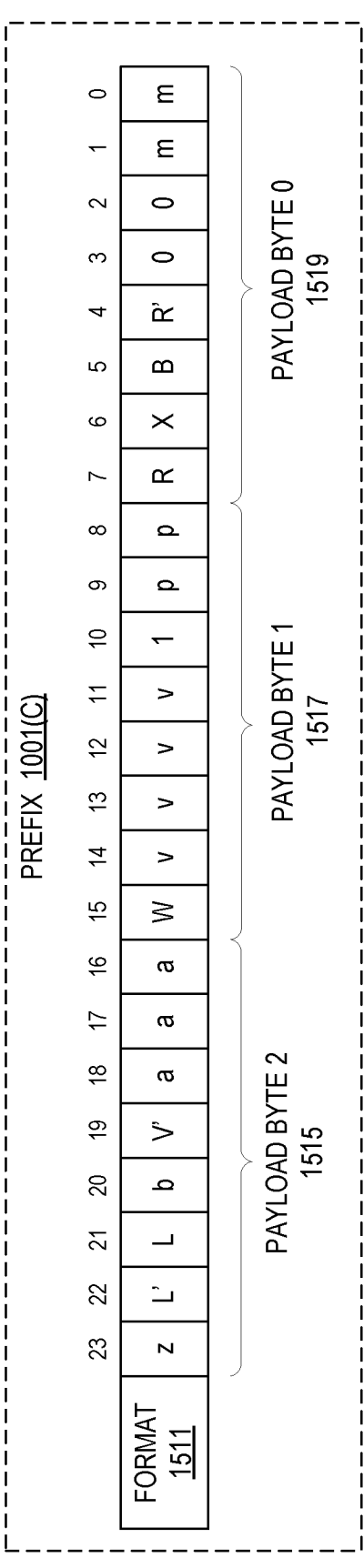
FIG. 15 illustrates examples of a third prefix.

FIG. 15 illustrates examples of a third prefix 1001(C). In some examples, the third prefix 1001(C) is an example of an EVEX prefix. The third prefix 1001(C) is a four-byte prefix.

The third prefix 1001(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 9) or predication utilize this prefix. Opmask register allow for conditional processing or selection control. Opmask instructions, whose source/destination operands are opmask registers and treat the content of an opmask register as a single value, are encoded using the second prefix 1001(B).

The third prefix 1001(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1001(C) is a format field 1511 that has a value, in one example, of 62H. Subsequent bytes are referred to as payload bytes 1515-1519 and collectively form a 24-bit value of P[23:0] providing specific capability in the form of one or more fields (detailed herein).

In some examples, P[1:0] of payload byte 1519 are identical to the low two mm bits. P[3:2] are reserved in some examples. Bit P[4] (R') allows access to the high 16 vector register set when combined with P[7] and the MOD R/M reg field 1144. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1144 and MOD R/M R/M field 1146. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111*b*.

P[15] is similar to W of the first prefix 1001(A) and second prefix 1011(B) and may serve as an opcode extension bit or operand size promotion.

P[18:16] specify the index of a register in the opmask (writemask) registers (e.g., writemask/predicate registers 915). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1001(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | 2$^{nd}$ Source or Destination |
| RM | MOD R/M R/M | GPR, Vector | 1$^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | 2$^{nd}$ Source |
| RM | MOD R/M R/M | k0-k7 | 1$^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 16 shows a program in a high-level language 1602 may be compiled using a first ISA compiler 1604 to generate first ISA binary code 1606 that may be natively executed by a processor with at least one first ISA core 1616. The processor with at least one first ISA core 1616 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1604 represents a compiler that is operable to generate first ISA binary code 1606 (e.g., object code) that can, with or without additional linkage processing, be executed on the processor with at least one first ISA core 1616. Similarly, FIG. 16 shows the program in the high-level language 1602 may be compiled using an alternative ISA compiler 1608 to generate alternative ISA binary code 1610 that may be natively executed by a processor without a first ISA core 1614. The instruction converter 1612 is used to convert the first ISA binary code 1606 into code that may be natively executed by the processor without a first ISA core 1614. This converted code is not necessarily to be the same as the alternative ISA binary code 1610; however, the converted code will accomplish the general operation and be made up of instructions from the alternative ISA. Thus, the instruction converter 1612 represents software, firmware, hardware, or a combination thereof that, through emulation, simulation or any other process, allows a processor or other electronic device that does not have a first ISA processor or core to execute the first ISA binary code 1606.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e., A and B, A and C, B and C, and A, B and C).

Examples include, but are not limited to:

1. An apparatus comprising:
   decoder circuitry to decode an instance of single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1; and
   execution circuitry to execute the decoded single instruction according to the opcode to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1.

2. The apparatus of example 1, wherein one or more fields for location information for the first source operand are to be used to identify a vector register.

3. The apparatus of example 1, wherein one or more fields for location information for the second source operand are to provide memory location information.

4. The apparatus of any of examples 1-3, wherein the at least floating-point value of the each of the two source operands is a data type of FP4, FP8, FP16, FP32, FP64, or BF16.

5. The apparatus of any of examples 1-4, wherein the at least floating-point value of the each of the two source operands is identified by the opcode.

6. The apparatus of any of examples 1-5, wherein the execution circuitry comprises a plurality of selectable comparator circuits.

7. The apparatus of example 6, where each of the plurality of selectable comparator circuits comprises a sign comparator, an exponent comparator, and a mantissa comparator.

8. The apparatus of any of examples 1-7, wherein the floating-point value first source is unordered with the floating-point value second source unordered when either of the floating-point values is not-a-number.

9. A system comprising:
   memory to store an instance of a single instruction;
   decoder circuitry to decode the instance of the single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point valu7e of the second source set OF=1, SF=1, ZF=0, PF=1, and CF=1; and
   execution circuitry to execute the decoded single instruction according to the opcode to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1.

10. The system of example 9, wherein one or more fields for location information for the first source operand are to be used to identify a vector register.

11. The system of example 9, wherein one or more fields for location information for the second source operand are to provide memory location information.

12. The system of any of examples 9-11, wherein the at least floating-point value of the each of the two source operands is a data type of FP4, FP8, FP16, FP32, FP64, or BF16.

13. The system of any of examples 9-12, wherein the at least floating-point value of the each of the two source operands is identified by the opcode.

14. The system of any of examples 9-13, wherein the execution circuitry comprises a plurality of selectable comparator circuits.

15. The system of example 14, where each of the plurality of selectable comparator circuits comprises a sign comparator, an exponent comparator, and a mantissa comparator.

16. The system of any of examples 9-15, wherein the floating-point value first source is unordered with the floating-point value second source unordered when either of the floating-point values is not-a-number.

17. A method comprising:

decoding an instance of single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1; and executing, using execution circuitry, the decoded single instruction according to the opcode to perform an unordered compare of at least one floating-point value of the each of the two source operands and stores a result of the comparison in a flags register according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1.

18. The method of example 17, wherein one or more fields for location information for the first source operand are to be used to identify a vector register.

19. The method of example 17, wherein one or more fields for location information for the second source operand are to provide memory location information.

20. The method of any of examples 17-19, wherein the at least floating-point value of the each of the two source operands is a data type of FP4, FP8, FP16, FP32, FP64, or BF16.

21. The method of any of examples 17-20, wherein the at least floating-point value of the each of the two source operands is identified by the opcode.

22. The method of any of examples 17-21, wherein the execution circuitry comprises a plurality of selectable comparator circuits.

23. The method of example 22, where each of the plurality of selectable comparator circuits comprises a sign comparator, an exponent comparator, and a mantissa comparator.

24. The method of any of examples 17-23, wherein the floating-point value first source is unordered with the floating-point value second source unordered when either of the floating-point values is not-a-number.

25. A non-transitory machine-readable medium that stores an instance of a single instruction that when processed by a computer is to cause any of the methods of examples 17-24 to be performed.

26. A method comprising:

translating an instance of single instruction of a first instruction set architecture (ISA) into one or more instructions of a second, different ISA, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1;

decoding the one or more instructions of the second, different ISA; and executing, using execution circuitry, the decoded one or more instructions of the second, different ISA according to the opcode of the single instruction to perform an unordered compare of at least one floating-point value of the each of the two source operands and stores a result of the comparison in a flags register according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1.

27. The method of example 26, wherein one or more fields for location information for the first source operand are to be used to identify a vector register.

28. The method of example 26, wherein one or more fields for location information for the second source operand are to provide memory location information.

29. The method of any of examples 26-28, wherein the at least floating-point value of the each of the two source operands is a data type of FP4, FP8, FP16, FP32, FP64, or BF16.

30. The method of any of examples 26-29, wherein the at least floating-point value of the each of the two source operands is identified by the opcode.

31. The method of any of examples 26-30, wherein the execution circuitry comprises a plurality of selectable comparator circuits.

32. The method of example 32, where each of the plurality of selectable comparator circuits comprises a sign comparator, an exponent comparator, and a mantissa comparator.

33. The method of any of examples 26-32, wherein the floating-point value first source is unordered with the floating-point value second source unordered when either of the floating-point values is not-a-number.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
decoder circuitry to decode an instance of single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register at least having an overflow flag (OF), a parity flag (PF), a sign flag (SF), a carry flag (CF), and a zero flag (ZF) according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1; and
execution circuitry to execute the decoded single instruction according to the opcode to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1.

2. The apparatus of claim 1, wherein one or more fields for location information for the first source operand are to be used to identify a vector register.

3. The apparatus of claim 1, wherein one or more fields for location information for the second source operand are to provide memory location information.

4. The apparatus of claim 1, wherein the at least floating-point value of the each of the two source operands is a data type of FP4, FP8, FP16, FP32, FP64, or BF16.

5. The apparatus of claim 1, wherein the at least floating-point value of the each of the two source operands is identified by the opcode.

6. The apparatus of claim 1, wherein the execution circuitry comprises a plurality of selectable comparator circuits.

7. The apparatus of claim 6, where each of the plurality of selectable comparator circuits comprises a sign comparator, an exponent comparator, and a mantissa comparator.

8. The apparatus of claim 1, wherein the floating-point value first source is unordered with the floating-point value second source unordered when either of the floating-point values is not-a-number.

9. A system comprising:
memory to store an instance of a single instruction;
decoder circuitry to decode the instance of the single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register at least having an overflow flag (OF), a parity flag (PF), a sign flag (SF), a carry flag (CF), and a zero flag (ZF) according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0,
   when the floating-point value of the first source is less than the floating-point value of the second source set OF=1, SF=0, ZF=0, PF=0, and CF=1, and
   when the floating-point value of the first source is unordered with the floating-point value of the second source set OF=1, SF=1, ZF=0, PF=1, and CF=1; and
execution circuitry to execute the decoded single instruction according to the opcode to perform an unordered compare of at least one floating-point value of the each of the two source operands and stores a result of the comparison in a flags register according to the following:
   when the floating-point value of the first source is greater than the floating-point value of the second source set OF=0, SF=0, ZF=0, PF=0, and CF=0,
   when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1.

10. The system of claim 9, wherein one or more fields for location information for the first source operand are to be used to identify a vector register.

11. The system of claim 9, wherein one or more fields for location information for the second source operand are to provide memory location information.

12. The system of claim 9, wherein the at least floating-point value of the each of the two source operands is a data type of FP4, FP8, FP16, FP32, FP64, or BF16.

13. The system of claim 9, wherein the at least floating-point value of the each of the two source operands is identified by the opcode.

14. The system of claim 9, wherein the execution circuitry comprises a plurality of selectable comparator circuits.

15. The system of claim 14, where each of the plurality of selectable comparator circuits comprises a sign comparator, an exponent comparator, and a mantissa comparator.

16. The system of claim 9, wherein the floating-point value first source is unordered with the floating-point value second source unordered when either of the floating-point values is not-a-number.

17. A method comprising:

decoding an instance of single instruction, the single instruction to include at least having one or more fields for an opcode and location information for a first source and a second source, wherein the opcode is to indicate execution circuitry is to perform an unordered compare of at least one floating-point value of the each of the two source operands and stores a result of the comparison in a flags register at least having an overflow flag (OF), a parity flag (PF), a sign flag (SF), a carry flag (CF), and a zero flag (ZF) according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1; and executing, using execution circuitry, the decoded single instruction according to the opcode to perform an unordered compare of at least one floating-point value of the each of the two source operands and stores a result of the comparison in a flags register according to the following:

when the floating-point value of the first source is greater than the floating-point value of the second source set OF=0, SF=0, ZF=0, PF=0, and CF=0, when the floating-point value of the first source is equal to the floating-point value of the second source set OF=1, SF=1, ZF=1, PF=0, and CF=0, when the floating-point value of the first source is less than the floating-point value of the second source set OF=1, SF=0, ZF=0, PF=0, and CF=1, and when the floating-point value of the first source is unordered with the floating-point value of the second source set OF=1, SF=1, ZF=0, PF=1, and CF=1.

18. The method of claim 17, wherein one or more fields for location information for the first source operand are to be used to identify a vector register.

19. The method of claim 17, wherein one or more fields for location information for the second source operand are to provide memory location information.

20. The method of claim 17, wherein the at least floating-point value of the each of the two source operands is a data type of FP4, FP8, FP16, FP32, FP64, or BF16.

* * * * *